3,165,828
METHOD OF ROLL-BONDING COPPER TO STEEL
James M. Kennedy, Byram, Conn., assignor to Revere Copper and Brass Incorporated, New York, N.Y., a corporation of Maryland
No Drawing. Filed Sept. 16, 1960, Ser. No. 56,342
5 Claims. (Cl. 29—487)

This invention relates to roll-bonding of copper to stainless steel.

Composite copper-stainless steel presently being produced is characterized by several limitations. Because of the tendency of the copper layer to undergo excessive grain growth at the elevated temperatures at which roll-bonding of the copper to the steel takes place most effectively, only relatively thin layers of copper are used. The practical problems involved in producing the composite from such thin copper sheet dictate the production of the composite in the form of relatively large sheets which, when subsequently cut into circular pieces for example in making cooking utensils, result in a large amount of scrap material.

The method of the present invention makes possible the forming of fine-grained copper-clad steel with any desired copper thickness and in shapes having substantially the same dimensions as the shapes required for subsequent fabrication operations. The method comprises certain improvements in the known method of bonding sheet copper to sheet steel wherein the steel is first plated on both sides with copper and then the copper-plated surface is roll-bonded to a sheet of copper at an elevated temperature. The improvement of the present invention comprises using a silver-containing copper base alloy for the copper sheet material and heating an assemblage composed of the copper-plated steel sheet one side of which is in physical contact with the copper alloy sheet to a temperature within the range of about 900° F. to about 1950° F. in a hydrogen-containing atmosphere. The thus-heated assemblage is then roll-bonded, and thereafter the copper plate is removed from the other side of the steel sheet.

The method of the invention is particularly applicable to the bonding of the copper to stainless steel such as 18–8, although it has been found equally applicable to other stainless steels as well as to low carbon steel and the like.

The copper plating directly on the sheet steel is effected according to conventional electrolytic practice. The copper deposit should be formed with sufficient care to insure a uniform thickness of an adherent coating which is of fine grain and free from nodules. The thickness of the copper deposit should be at least 0.00005 inch, and preferably at least 0.00025 inch, and up to any practical thickness. Although the copper-base alloy layer can be bonded easily and effectively to a copper deposit as thick as one inch or more, there is generally no need for such a thick layer; for making utensils and the like, a more practical upper limit, such as about 0.005 inch, is observed. The presently preferred plate thickness is about 0.00035 inch. The copper deposit on one side of the steel sheet permits effective bonding of the plated steel to the sheet of copper-base alloy, and the deposit on the other side of the steel sheet, particularly in thickness of about 0.0002 inch or more, protects that surface during the subsequent heating and bonding steps.

The copper-base alloy used as the cladding layer pursuant to the invention is a silver-copper alloy containing from about 0.09% to about 0.20%, and preferably about 0.15%, by weight of silver and the balance essentially copper. This alloy is characterized by insignificant grain growth at the heating temperatures required for the subsequent roll-bonding operation, and in addition it has been found to bond readily at these temperatures to the copper plate on the surface of the steel when the surfaces of both the alloy sheet and the copper plate have been heated in a controlled hydrogen-containing atmosphere. There is no limit as to the thickness of this copper alloy sheet which may be used, and no special preparation of the sheet is required other than the conventional precaution of having its surface clean at the time of bonding. It has been found in practice that any residual roll-mill oil on the copper alloy sheet is effectively removed by volatilization during heating prior to bonding and that any copper oxide scale on the surface of the sheet is reduced to copper metal by the hydrogen-containing atmosphere used in the heating operation. Thus by the time the copper alloy sheet is heated to a bonding temperature its surface is free from oil and scale so that it will bond permanently to the copper-plated steel.

The bonding of the copper-plated steel sheet to the copper alloy sheet does not require any sealing of the edges of the composite assemblage prior to the heating and bonding steps. Thus, the prior art procedure of crimping or welding the edges of the assemblage are eliminated by the practice of the present invention. It is desirable, however, to hold the two sheets in physical contact with one another during the heating and bonding steps, and this can be accomplished readily by tacking the two sheets together, as by spot welding, advantageously along that edge which will become the leading edge during the roll-bonding step. It has been found that such tacking does not impede the aforementioned volatilization of oil and removal of oxide scale from the surface of the copper alloy sheet during the heating step.

The heating of the thus-assembled sheet of copper-plated steel and sheet of copper alloy is effected in a reducing atmosphere such as that conventionally used for bright annealing of copper, that is, an atmosphere containing an amount of hydrogen not in excess of that which will cause embrittlement of the copper. The hydrogen conditions the surfaces of the silver-containing copper alloy sheet and of the copper-plated steel so that they will adhere permanently during the bonding step. The upper limit of hydrogen in the reducing atmosphere cannot be specified with precision inasmuch as it varies with the temperature to which the copper-containing parts are heated in the bonding operation. However, two to three percent hydrogen is generally below that amount of hydrogen at which hydrogen-embrittlement of the copper plate or copper alloy sheet becomes objectionable. Useful reducing atmospheres for practicing the invention include dissociated ammonia obtained by completely burning ammonia in air and comprising about 1% hydrogen and 99% nitrogen, as well as combusted natural fuel gas products containing for example (a) 11.5% carbon dioxide, 0.7% carbon monoxide, 0.7% hydrogen and 87.1% nitrogen, (b) 2% carbon monoxide, 2% hydrogen and 96% nitrogen, and (c) 1.5% hydrogen, 1.9% carbon monoxide, 12.5% carbon dioxide and 84.1% nitrogen. In all such gas mixtures, their content of water vapor should be lowered by refrigeration or the like in order to prevent oxidation of the copper.

The temperature to which the copper-plated steel and copper alloy sheet assemblage is heated pursuant to the invention is generally within the range of about 800° F. to 1950° F. Within this range, higher temperatures require less pressure in the roll bonding step and lower temperatures require higher rolling pressures. It has been found in practice that a heating temperature of about 1100° to 1650° F. is particularly conducive to effective bonding at moderate roll pressure and reduction.

The rolling operation requires only that amount of roll pressure and sheet reduction conventionally used heretofore. For example, reductions of about 4% are sufficient to effect permanent bonding of the copper alloy sheet to the copper-plated steel sheet. It has been found to be advantageous to water-quench the rolled assemblage immediately after it leaves the bonding rolls, as by discharging the sheet product from the bonding rolls directly into a tank of water.

The resulting bonded assemblage is then treated to remove the copper plate from the surface of the steel opposite the copper alloy clad layer. Although this can be done mechanically by abrasion or the like, it has been found that immersion of the assemblage in a solution of one part of concentrated nitric acid in one part by volume of water will readily remove the exposed copper plate and leave a stainless steel surface as bright as it was prior to the copper plating operation.

The foregoing discussion has been directed to the production of copper-clad steel, but it must be understood that it is equally applicable to the production of a steel-copper composite in which the copper is sandwiched between two layers of the steel.

The following specific example is illustrative of the practice of the invention for making such a stainless steel-copper-stainless steel composite blank that could be fabricated into a one-quart saucepan. Two round blanks 9⅞" in diameter, 0.010" thick and made from type 302 stainless steel, were subjected to an anodic etch in an alkaline cleaning electrolyte, a water rinse, a cathodic etch in an acidic activating electrolyte, a copper strike in a conventional cyanide copper-plating bath, a deposition of a copper plate .00025" thick in the same cyanide bath, a rinse and finally drying. The two resulting copper-plated steel blanks were assembled on the outside of a silver-copper blank composed of 0.15% silver and the balance copper, this inner blank having a diameter of 9⅞" and a thickness of 0.012". The assemblage was then tacked by spot welding in two places spaced 1" apart. The assembled sandwich was then placed in a gas-fired roller-hearth furnace maintained at a temperature of 1650° F. with the furnace atmosphere provided by the products of combustion of natural gas as described hereinbefore. After the sandwich was raised to the furnace temperature, it was passed through a rolling mill wherein its total thickness was reduced from 0.0325" to 0.030". This rolling at the aforesaid elevated temperature effected the bonding of the stainless-copper-stainless assembly into one composite blank. During the rolling operation the assembly was elongated from 9⅞" to 10½", so a trimming operation was performed to bring the blank back to its original 9⅞" diameter. The resulting blank was then submerged in a solution of one part of nitric acid and one part water, and after the protective copper plate on the two outside surfaces had dissolved in the nitric acid solution the blank was rinsed and dried. From this point it was drawn and further fabricated into a one-quart saucepan according to conventional practice. The bond withstood the drawing operation without any sign of failure, and the final product passed all quality tests normally applied to such a product.

This application is a continuation-in-part of may application Serial No. 858,604, filed December 10, 1959 and now abandoned.

I claim:

1. In the method of bonding sheet copper to sheet steel wherein the steel is plated on both sides with copper and the copper-plated surface of the steel is roll-bonded to the sheet of copper at an elevated temperature, the improvement which comprises bringing one side of the thus-plated steel sheet into physical contact with a sheet of a silver-containing copper base alloy the silver content of which is within the range of about 0.09 to about 0.20% and the balance of which is essentially copper, heating the resulting assemblage to a temperature within the range of about 800° F. to about 1950° F. in a reducing atmosphere containing an amount of hydrogen not in excess of that which will cause embrittlement of the copper suitable for bright annealing of copper, roll-bonding the thus-heated assemblage, and thereafter removing the copper plate from the other side of the steel sheet.

2. In the method of bonding sheet copper to sheet steel wherein the steel is plated on both sides with copper and the copper-plated surface of the steel is roll-bonded to the sheet of copper at an elevated temperature, the improvement which comprises bringing one side of the thus-plated steel sheet into physical contact with a sheet of a silver-containing copper base alloy the silver content of which is within the range of about 0.09 to about 0.20% and the balance of which is essentially copper, heating the resulting assemblage to a temperature of about 1100° F. to 1650° F. in a reducing atmosphere containing an amount of hydrogen not in excess of that which will cause embrittlement of the copper suitable for bright annealing of copper, roll-bonding the thus-heated assemblage, and thereafter removing the copper plate from the other side of the steel sheet.

3. In the method of bonding sheet copper to sheet steel wherein the steel is plated on both sides with copper and the copper-plated surface of the steel is roll-bonded to the sheet of copper at an elevated temperature, the improvement which comprises bring one side of the thus-plated steel sheet into physical contact with a sheet of a silver-containing copper base alloy the silver content of which is within the range of about 0.09 to about 0.20% and the balance of which is essentially copper, heating the resulting assemblage to a temperature within the range of about 800° F. to about 1950° F. in a hydrogen-containing atmosphere containing an amount of hydrogen not in excess of that which will cause embrittlement of the copper comprising the products of combustion of a natural gas-fired furnace, roll-bonding the thus-heated assemblage, and thereafter removing the copper plate from the other side of the steel sheet.

4. In the method of bonding sheet copper to sheet steel wherein the steel is plated on both sides with copper and the copper-plated surface of the steel is roll-bonded to the sheet of copper at an elevated temperature, the improvement which comprises bringing one side of the thus-plated steel sheet into physical contact with a sheet of a silver-bearing copper base alloy the silver content of which is within the range of about 0.09 to about 0.20% and the balance of which is essentially copper, the sheets of steel and copper being of approximately the same dimensions as desired final product, heating the resulting assemblage to a temperature within the range of about 800° F. to about 1950° F. in a reducing atmosphere containing an amount of hydrogen not in excess of that which will cause embrittlement of the copper suitable for bright annealing of copper, roll-bonding the thus-heated assemblage, and thereafter removing the copper plate from the other side of the steel sheet.

5. In the method of bonding sheet copper to sheet steel wherein the steel is plated on both sides with copper and the copper-plated surface of the steel is roll-bonded to the sheet of copper at an elevated temperature, the improvement which comprises bringing one side of the thus-plated steel sheet into physical contact with a sheet of a silver-containing copper base alloy the silver content of which is within the range of about 0.09 to about 0.20% and the balance of which is essentially copper, heating the resulting assemblage to a temperature within the range of about 800° F. to about 1950° F. in a reducing atmosphere containing an amount of hydrogen not in excess of that which will cause embrittlement of the copper suitable for bright annealing of copper, roll-bonding the thus-heated assemblage, and thereafter removing the copper plate from the other side of the steel sheet with an aqueous solution of nitric acid.

References Cited in the file of this patent

UNITED STATES PATENTS

| | | | |
|---|---|---|---|
| 729,113 | Anderson | May 26, | 1903 |
| 1,011,744 | Clamens | Dec. 12, | 1911 |
| 1,077,977 | Fuller | Nov. 11, | 1913 |
| 1,374,110 | Pittevil | Apr. 5, | 1921 |
| 1,433,213 | Lowell | Oct. 24, | 1922 |
| 1,943,853 | Austin | Jan. 16, | 1934 |
| 2,053,096 | McKay et al. | Sept. 1, | 1936 |
| 2,314,882 | Hensel et al. | Mar. 30, | 1943 |
| 2,479,053 | Adams | Aug. 16, | 1949 |
| 2,693,121 | Dight | Nov. 2, | 1954 |
| 2,911,710 | Kanter et al. | Nov. 10, | 1959 |